(12) United States Patent
Obadia et al.

(10) Patent No.: US 10,118,514 B2
(45) Date of Patent: Nov. 6, 2018

(54) SELF-ADJUSTING VEHICLE SEAT

(71) Applicant: Zodiac Seats France, Issoudun (FR)

(72) Inventors: Jean-Marc Obadia, Maubec (FR); Laurent Stritter, Elancourt (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 15/037,348

(22) PCT Filed: Nov. 20, 2014

(86) PCT No.: PCT/IB2014/066207
§ 371 (c)(1),
(2) Date: May 18, 2016

(87) PCT Pub. No.: WO2015/075671
PCT Pub. Date: May 28, 2015

(65) Prior Publication Data
US 2016/0272092 A1    Sep. 22, 2016

Related U.S. Application Data

(60) Provisional application No. 61/906,432, filed on Nov. 20, 2013.

(30) Foreign Application Priority Data

Nov. 20, 2013  (FR) ..................... 13 61375

(51) Int. Cl.
*B60N 2/90* (2018.01)
*B60N 2/44* (2006.01)
(Continued)

(52) U.S. Cl.
CPC ........... *B60N 2/4415* (2013.01); *B60N 2/002* (2013.01); *B60N 2/0244* (2013.01); *B60N 2/914* (2018.02);
(Continued)

(58) Field of Classification Search
None
See application file for complete search history.

(56) References Cited

U.S. PATENT DOCUMENTS 2,938,570 A * 5/1960 Flajole ................. A47C 27/081
              137/861
4,491,364 A * 1/1985 Hattori ................. B60N 2/4415
              137/871
(Continued)

FOREIGN PATENT DOCUMENTS

DE   3334864 A1 * 4/1985 ............... A47C 4/54
DE   3505088 C1 * 11/1986 ............. A47C 7/467
(Continued)

OTHER PUBLICATIONS

International Patent Application No. PCT/IB2014/066207, International Preliminary Report on Patentability, dated Jun. 2, 2016.
(Continued)

*Primary Examiner* — David E Allred
(74) *Attorney, Agent, or Firm* — Kilpatrick Townsend & Stockton LLP; Dean W. Russell; Davidson G. Lucas

(57) ABSTRACT

Described are seat units with a seat pan (2) coupled to a seat back (3), inflatable cushions (5) positioned proximate the seat pan and/or the seat back, inflatable airbags (6) positioned proximate the inflatable cushions (5), and a pressure sensor (9) positioned over at least one of the seat pan (2) and the seat back (3) so that the inflatable cushions (5) and the inflatable airbags (6) are substantially covered by the pressure sensor (9). The pressure sensor (9) is configured to generate a pressure map, and a control unit (11) is configured to analyze the pressure map for at least one pressure irregularity within a pressure distribution, and adjust a pressure inside at least one of the inflatable cushions (5) and/or the
(Continued)

inflatable airbags (6) to minimize the pressure irregularity within the pressure distribution.

15 Claims, 3 Drawing Sheets

(51) Int. Cl.
   *B64D 11/06* (2006.01)
   *B60N 2/00* (2006.01)
   *B60N 2/02* (2006.01)
(52) U.S. Cl.
   CPC .......... *B64D 11/06* (2013.01); *B64D 11/0647* (2014.12); *B60N 2002/0268* (2013.01); *Y02T 50/46* (2013.01)

(56) References Cited

U.S. PATENT DOCUMENTS

| | | | | |
|---|---|---|---|---|
| 4,655,505 A * | 4/1987 | Kashiwamura | ........ | A47C 7/467 297/284.6 |
| 4,965,899 A * | 10/1990 | Sekido | ........ | B60N 2/665 297/284.11 |
| 5,060,174 A | 10/1991 | Gross | | |
| 5,127,708 A * | 7/1992 | Kishi | ........ | A61B 5/18 297/284.1 |
| 5,129,704 A * | 7/1992 | Kishi | ........ | B60N 2/0224 297/284.1 |
| 5,170,364 A * | 12/1992 | Gross | ........ | A47C 4/54 297/284.6 |
| 5,283,735 A | 2/1994 | Gross et al. | | |
| 5,320,409 A * | 6/1994 | Katoh | ........ | B60N 2/0232 297/284.6 |
| 5,687,099 A | 11/1997 | Gross et al. | | |
| 6,098,000 A * | 8/2000 | Long | ........ | A47C 4/54 297/284.6 |
| 6,203,105 B1 * | 3/2001 | Rhodes, Jr. | ........ | A47C 4/54 297/284.1 |
| 6,220,667 B1 * | 4/2001 | Wagner | ........ | B60N 2/002 297/284.6 |
| 6,273,810 B1 * | 8/2001 | Rhodes, Jr. | ........ | A47C 4/54 297/180.13 |
| 6,345,839 B1 * | 2/2002 | Kuboki | ........ | B60N 2/002 280/735 |
| 7,261,380 B2 * | 8/2007 | Ha | ........ | A61H 1/006 297/219.1 |
| 7,322,651 B2 * | 1/2008 | Makhsous | ........ | A47C 17/163 297/217.2 |
| 7,708,343 B2 * | 5/2010 | Kayumi | ........ | B60N 2/4492 297/284.9 |
| 7,857,387 B2 * | 12/2010 | Habegger | ........ | B60N 2/66 297/284.1 |
| 8,342,607 B2 * | 1/2013 | Hofmann | ........ | B60N 2/7017 297/284.6 |
| 8,616,654 B2 * | 12/2013 | Zenk | ........ | B60N 2/4415 297/284.3 |
| 8,678,500 B2 * | 3/2014 | Lem | ........ | B60N 2/448 297/284.6 |
| 2002/0167486 A1 * | 11/2002 | Tan | ........ | B60N 2/002 345/156 |
| 2007/0114832 A1 * | 5/2007 | Voigt | ........ | A47C 4/54 297/452.41 |
| 2008/0197677 A1 | 8/2008 | Nivet | | |
| 2015/0321590 A1 * | 11/2015 | Mizoi | ........ | B60N 2/62 297/284.4 |

FOREIGN PATENT DOCUMENTS

| | | | |
|---|---|---|---|
| EP | 154582 A2 * | 9/1985 | |
| EP | 1958816 | 8/2008 | |
| FR | 3013328 | 5/2015 | |
| JP | 61291233 A * | 12/1986 | |
| WO | 9841126 | 9/1998 | |

OTHER PUBLICATIONS

France Patent Application No. 13/61375, Search Report, dated Jul. 29, 2014.
International Patent Application No. PCT/IB2014/066207 Search Report and Written Opinion dated Feb. 26, 2015.

* cited by examiner

SELF-ADJUSTING VEHICLE SEAT

CROSS REFERENCE TO RELATED APPLICATIONS

This application is the U.S. national phase entry of International Patent Application Serial No. PCT/IB2014/066207 ("the '207 application"), filed on Nov. 20, 2014, which application is related to and claims priority benefits from U.S. Provisional Application Ser. No. 61/906,432 ("the '432 application"), filed on Nov. 20, 2013, entitled SELF-ADJUSTING VEHICLE SEAT, and French Application No. FR13/61375, filed on Nov. 20, 2013, entitled SIEGE D'AVION AUTO-AJUSTABLE A LA MORPHOLOGIE D'UN PASSAGER, the entire contents of each of which are incorporated herein by reference.

FIELD OF THE INVENTION

The present invention relates to an aircraft seat, which is self-adjustable to the morphology of a passenger seated thereon.

BACKGROUND

Generally, airline or other vehicle seats include a seat pan (also referred to as a seat bottom) and a seat back, in which one or both are equipped with cushions made of foam having a fixed firmness and shape. In some cases, the cushion may be made with an inflatable cushion, but which is likewise not adjustable in shape and/or is not adjustable by the passenger. While these cushions may be suitable for the majority of passengers, the fixed design limits such cushions from being able to conform to the morphology of all passengers seated thereon.

Thus, to provide a more adjustable and comfortable experience for all passengers seated in such seats, it may be desirable to provide a vehicle seat design that allows the shape and/or firmness of the seat pan and/or seat back cushion to adjust to each passenger's particular morphology (i.e., weight and/or size).

For example, it may be desirable to provide vehicle seats with inflatable cushions of different shapes and/or with a pressure mapping sensor and control unit, which may be able to detect pressure peaks, control pressure distribution, and/or the overall size and shape of the passenger. Through the use of the pressure mapping sensor and control unit, the firmness and shape of the cushions may then be self-adjusting to the passenger's overall size and shape.

It may also be desirable to adapt the vehicle seat to utilize the pressure mapping sensor to determine when the seat should be reclined based on a passenger pressing against the seat back and to determine when the seat should be raised based on a passenger lifting away from the seat back.

Such a seat design may provide better comfort adjustment based on each particular passenger's morphology; include self-adjustability to simplify the seat design by minimizing the need for additional controls; achieve weight reduction through the use of inflatable cushions; and/or better sustain passengers in a sleeping position (lateral upper and lower), as well as being able to reach a flatter shape for sleeping.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat unit comprises a seat pan coupled to a seat back, a plurality of inflatable cushions positioned proximate at least one of the seat pan and the seat back, a plurality of inflatable airbags positioned proximate at least one of the plurality of inflatable cushions, a pressure sensor positioned over at least one of the seat pan and the seat back so that the plurality of inflatable cushions and the plurality of inflatable airbags are substantially covered by the pressure sensor, wherein the pressure sensor is configured to generate a pressure map, and a control unit communicatively coupled to the pressure sensor and configured to analyze the pressure map for at least one pressure irregularity within a pressure distribution, and configured to adjust a pressure inside at least one of the plurality of inflatable cushions or the plurality of inflatable airbags to minimize the at least one pressure irregularity within the pressure distribution.

In some embodiments, the at least one pressure irregularity is defined as a location where the pressure is locally higher than an average pressure in a range of approximately 10%. The pressure sensor may be a planar sensor made of a deformable or flexible material configured to correspond to a shape of the plurality of inflatable cushions and the plurality of inflatable airbags.

In certain embodiments, the seat unit further comprises an automatic seat adjustment, wherein the control unit is configured to control a relative movement of the seat back relative to the seat pan based on a change in the pressure distribution detected by the pressure sensor, wherein the change in the pressure distribution reflects at least one of a pressure transfer between the seat pan and the seat back, and a pressure irregularity in a form of a pressure peak or a pressure loss over the seat pan or the seat back. Movement of the seat back may be permitted if the change in pressure distribution is present for a time duration that exceeds a threshold time period. A manual switch may be included that enables the automatic seat adjustment.

In some embodiments, the control unit is configured to deflate the plurality of inflatable airbags when the seat unit is in a bed position.

According to some embodiments, the seat pan and the seat back each comprise at least one of the plurality of inflatable cushions and at least one of the plurality of inflatable airbags, wherein the plurality of inflatable cushions are configured to provide a substantially flat support surface for the seat unit, and the plurality of inflatable airbags are configured to provide lateral support for a passenger seated in the seat unit.

In certain embodiments, each of the plurality of inflatable airbags comprises at least two compartments welded together, wherein each of the at least two compartments is formed by a tube that is inflated or deflated via a connection.

The tubes that form the at least two compartments of each inflatable airbag may be in fluid communication with each other so that the tubes are collectively inflated or deflated via a single connection. Alternatively, the tubes that form the at least two compartments of each inflatable airbag may not be in fluid communication with each other so that each tube is inflated or deflated via separate connections.

According to some embodiments, the plurality of inflatable cushions and the plurality of inflatable airbags are coated with a sealable material to ensure airtightness.

In certain embodiments, connections for the plurality of inflatable cushions and the plurality of inflatable airbags in a pressure distributor are located in the seat back.

The seat unit may further comprise a plurality of pre-determined positions, and the seat unit may be configured to transition into a pre-determined position selected by a passenger seated in the seat unit, and adapt to a shape of the passenger performing at least one of: changing the pressure distribution inside at least one of the plurality of inflatable cushions or the plurality of inflatable airbags, and changing relative orientations of at least one of the seat pan, the seat back, and a footrest around the selected pre-determined position.

In some embodiments, the control unit is configured to alter the pressure distribution among the plurality of inflatable cushions and the plurality of inflatable airbags when a passenger seated in the seat unit has maintained a stationary position for a time duration that exceeds a threshold time period. The control unit may also be configured to alter the pressure distribution among the plurality of inflatable cushions and the plurality of inflatable airbags when a frequency of movement of a passenger seated in the seat unit has exceeded a maximum threshold number within a specified period of time.

BRIEF DESCRIPTION OF THE DRAWINGS

In the following detailed description, embodiments of the invention are described referring to the following figures.

Identical elements, like, or analogs retain the same references from one figure to another.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of vehicle seats may be described with reference to an aircraft seat, they are by no means so limited. In fact, the seats may be used in conjunction with any type of vehicle or otherwise as desired.

Figure 1:
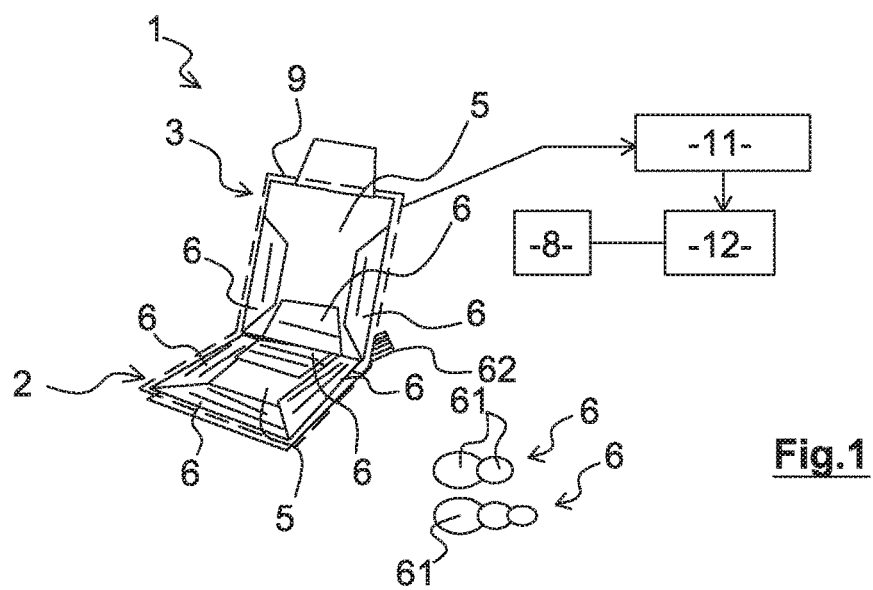
FIG. 1 is a perspective view of a seat unit with a plurality of inflatable cushions and a plurality of air bags, according to certain embodiments of the present invention.
Figure 5:
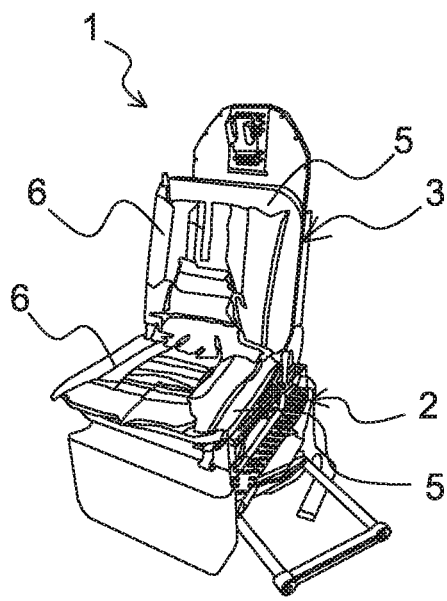
FIG. 5 is a perspective view of a vehicle seat with a plurality of inflatable cushions and a plurality of air bags without a pressure sensor or a fabric seat cover, according to certain embodiments of the present invention.

According to certain embodiments of the invention, as best shown in FIGS. 1 and 5, a vehicle seat unit 1 comprises a seat pan 2 and a seat back 3. The seat unit 1 may also be provided with actuators, such as a recline lock or other similar device, which are configured to rotate the seat back 3 and seat pan 2 between upright, reclined, and bed positions, respectively.

In certain embodiments, the seat pan 2 and/or the seat back 3 comprise one or more foundation cushions 5 formed of a "double-wall" or "drop-stitch" fabric, which may be a three-dimensionally woven structure whose two base airtight fabrics (such as polyvinyl chloride or "PVC") are interlinked with numerous spacer threads. Since each spacer thread has the same length, these threads define the maximum distance between the two base fabrics. These airtight fabrics are then welded along the perimeter to make the entire cushion 5 airtight. As a result, the hollow body between the two base fabrics can be filled with air or other media, while retaining a dimensionally stable and substantially flat surface. The cushion 5 may also be formed of two layers of fabric linked together either by multiple yarns (as in three-dimensional fabrics or also called "spacers") or by tethers that are distributed on the surface of the layers of fabric in order to achieve a substantially flat cushion 5. Because the cushions 5 are substantially flat, they provide the main firmness for the seat unit 1 in the upright and reclined positions, and form the mattress for the seat unit 1 in the bed position.

In certain embodiments, a plurality of airbags 6 may be positioned over at least a portion of each cushion 5. These airbags 6 may have different shapes. The airbags 6 positioned on the seat back 3 may be configured to provide improved lateral support for a passenger seated in the seat unit 1, whereas the airbags 6 positioned on the seat pan 2 may be configured to provide improved lower support for a passenger seated in the seat unit 1. These airbags 6 may be formed of pure polyurethane, a polyurethane coated fabric, or any other suitable material, and may be welded together to ensure a tight connection. In some embodiments, all of the cushions 5 and airbags 6 may be coated with a layer of polyurethane to ensure airtightness and to enable their welding.

Figure 2:
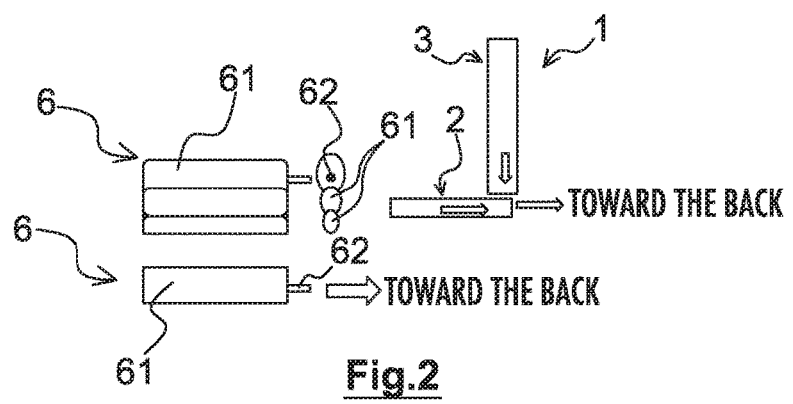
FIG. 2 includes top, rear, and side views of a multi-compartment air bag with a tube connection exiting the air bag toward the back of the seat unit, and a side view of the seat unit showing the overall tube routing toward the back of the seat unit, according to certain embodiments of the present invention.
Figure 3:
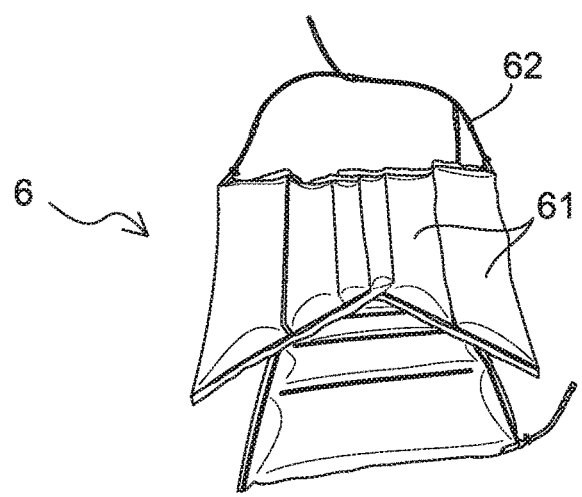
FIG. 3 is a perspective view of a vehicle seat pan with a plurality of inflatable cushions and a plurality of air bags without a pressure sensor or fabric seat cover, according to certain embodiments of the present invention.

As best illustrated in FIGS. 2 and 3, each airbag 6 comprises at least two compartments welded together, wherein each compartment is formed by a tube 61. The tube 61 may have any suitable cross-section shape including but not limited to circular, rectilinear, square, trapezoidal, parabolic, polygonal, or any other suitable shape. The tubes 61 may have a decreasing diameter when moving from an outer edge of the airbag 6 positioned proximate an outer edge of the seat unit 1 toward an inner edge of the airbag 6 positioned proximate an interior region of the seat unit 1. Depending on the function and/or location of the particular airbag 6, it may have two or three (or more) adjacent tubes 61. A person of ordinary skill in the relevant art will understand that the airbags 6 may have any suitable number of tubes 61 as needed to achieve the desired amount of support and/or stability in a particular location on the seat unit 1. All of the tubes 61 within a particular airbag 6 may be in fluid communication with one another so that the tubes 61 may be collectively inflated and/or deflated via a single connection 62. Alternatively, the tubes 61 may not be in fluid communication with one another so that each tube 61 may be inflated and/or deflated via separate connections 62.

In certain embodiments, as best shown in FIG. 2, the connections 62 for each cushion 5 and airbag 6, which are provided to connect the cushions 5 and airbags 6 to a central pressure distributor 8, may be located in the rear of the seat unit 1. In additional embodiments, the connections may be positioned on the side, front, and/or in a upper region of the seat unit 1. A person of ordinary skill in the relevant art will understand that the connections 62 may be positioned in any suitable location and using any suitable design.

According to some embodiments, the cushions 5 and/or airbags 6 may be positioned in any suitable location on the seat unit 1, including but not limited to the headrest, armrests, and/or footrest. In other words, the cushions 5 and/or airbags 6 may be positioned in any part of the seat unit 1 that is configured to contact a body of a passenger seated in the seat unit 1.

Figure 4:
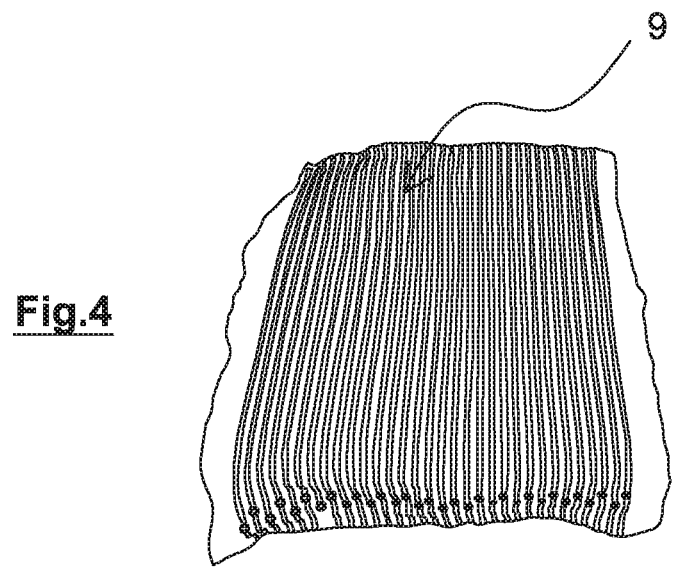
FIG. 4 is a perspective view of a pressure sensor positioned over the plurality of inflatable cushions and plurality of air bags of FIG. 3, according to certain embodiments of the present invention.
Figure 6:
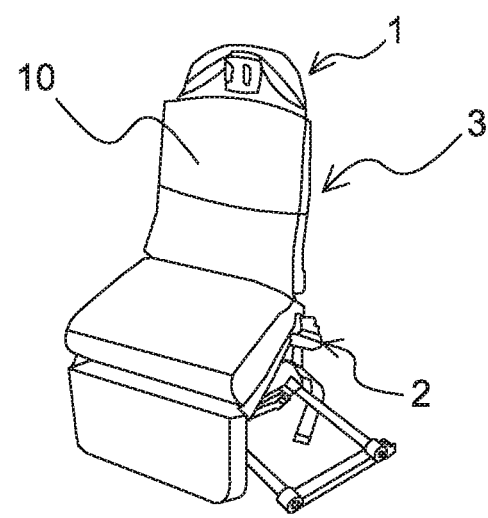
FIG. 6 is a perspective view of the vehicle seat of FIG. 5 with the fabric seat cover and the pressure sensor positioned over the plurality of inflatable cushions and the plurality of air bags, according to certain embodiments of the present invention.

In some embodiments, as illustrated in FIG. 4, a pressure sensor 9 may be positioned so as to cover some or substantially all of the cushions 5 and/or airbags 6. As a result, the pressure sensor 9 is positioned between the cushions 5 and/or airbags 6 and a cover 10 in the fully assembled seat unit 1, as shown in FIG. 6.

In these embodiments, the pressure sensor 9 may be a planar sensor formed of a deformable or flexible material, such as cloth, which allows the pressure sensor 9 to easily conform to the shape of the seat unit 1, cushions 5, and/or airbags 6. In some embodiments, the pressure sensor 9 may be a capacitive type. For example, the pressure sensor 9 may be a pressure sensor having a plurality of mesh-type digital numerical, analog, and/or threshold sensors, piezoelectric sensors, or any type of sensor configured to provide sufficient information regarding the pressure distribution of the passenger's body over the surface of the seat unit 1.

In certain embodiments, the pressure sensor 9 may be connected to a control unit 11. This control unit 11 may be configured to analyze a pressure map provided by the pressure sensor 9. Specifically, the control unit 11 may analyze the pressure map by evaluating the contact surface between the passenger and the cushions 5/airbags 6 to detect pressure peaks or pressure drops that indicate pressure irregularities with the pressure distribution, and determine the size and shape (morphology) of the passenger seated in the seat unit 1.

Figure 7:
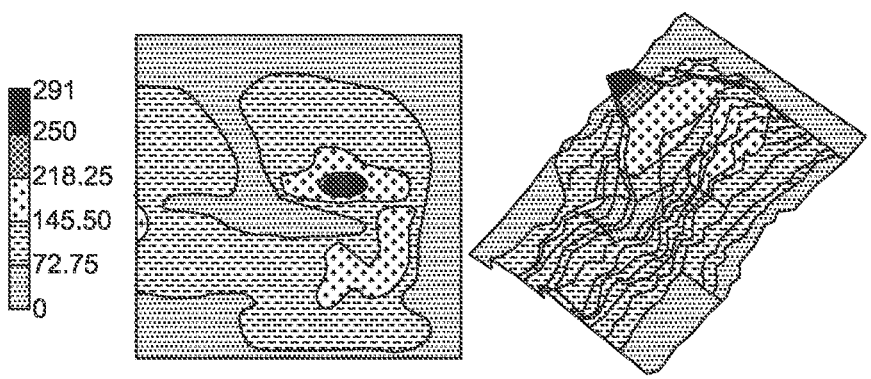
FIG. 7 is an example of a top view and a perspective view of a pressure map generated by a pressure sensor positioned over a seat pan of a seat unit showing the imbalance in pressure applied by a passenger seated in the seat unit to the pressure sensor, according to certain embodiments of the present invention.

In certain cases, a pressure peak may be defined as a location where the pressure is locally higher than the average pressure in a range of approximately 10%. In other words, the pressure is locally higher than the sum of the average pressure applied by the passenger plus approximately 10% of this average pressure. Conversely, a pressure drop may be defined as a location where the pressure is locally lower than the average pressure in a range of approximately 10%. A person of ordinary skill in the art will understand that the threshold value of approximately 10% is but one example and may be adjusted higher or lower as needed or desired depending on the particular application. FIG. 7 illustrates a pressure map provided by the pressure sensor 9 located on the seat pan 2 and the seat back 3 that is generated when a passenger is seated in the seat unit 1.

Based on the analysis of the pressure map provided by the pressure sensor 9, the control unit 11 adjusts the pressure within the appropriate cushions 5 and/or airbags 6 in order to adjust the firmness and shape of the seat unit 1 to more effectively accommodate the morphology of the passenger seated in the seat unit 1, which thereby improves the comfort of the passenger. To adjust the pressure within the appropriate cushions 5 and/or airbags 6, the control unit 11 sends a signal to a pump 12 and the pressure distributor 8 connected to each cushion 5 and/or airbag 6 via the corresponding connection 62.

The control unit 11 thus controls the pump 12 and the pressure distributor 8 so that air is injected into or withdrawn from the appropriate cushions 5 and/or airbags 6 in a sequential manner until a proper distribution of pressure is reached, which is defined as being achieved when the pressure peaks and/or pressure drops have substantially disappeared from the pressure map. In order to minimize the pressure peak in a particular area, the cushions 5 and/or airbags 6 corresponding to the area on the seat unit 1 where the pressure peak was observed may be deflated, while other cushions 5 and/or airbags 6 corresponding to areas where the pressure is lower may be inflated so as to provide a more even weight distribution of the passenger on the assembly of cushions 5 and/or airbags 6 of the seat unit 1. Thus, airbags 6 will tend to be more deflated for overweight passengers and the airbags 6 will tend to be more inflated for lighter passengers in order to provide a similar level of comfort and support for each passenger seated in the seat unit 1.

In these embodiments, the system is not configured to use the pressure measurement returned by pressure sensors within the cushions 5 and/or the airbags 6 as part of the control system described above. These internally-located pressure sensors are provided to measure pressure inside the cushions 5 and/or the airbags 6 only for safety reasons in order to maintain the pressure between minimum and maximum pressure thresholds to avoid deterioration or bursting the cushions 5 and/or the airbags 6.

In certain embodiments, the seat unit 1 may further comprise a plurality of pre-determined positions, including but not limited to a bed position, a reading position, a reclining position, an eating position, a working position, etc. In these embodiments, the seat unit 1 is configured to transition into the pre-determined position selected by the passenger and to adapt to the shape of the passenger by performing at least one of the following actions: (1) changing the pressure distribution inside at least one of the cushions 5 and/or the airbags 6 and/or (2) changing the relative orientations of the seat pan 2, seat back 3, and/or a footrest around the selected pre-determined position.

In certain embodiments, the control unit 11 may provide for automatic adjustment of the seat unit 1 between reclined and upright positions, depending on the pressure exerted by the passenger on the seat unit 1. For example, the control unit 11 may be configured to control relative movement of the seat back 3 relative to the seat pan 2 when the control unit 11 recognizes a change in pressure distribution over the seat back 3 based on the pressure readings detected by the pressure sensor 9.

Figure 8A:
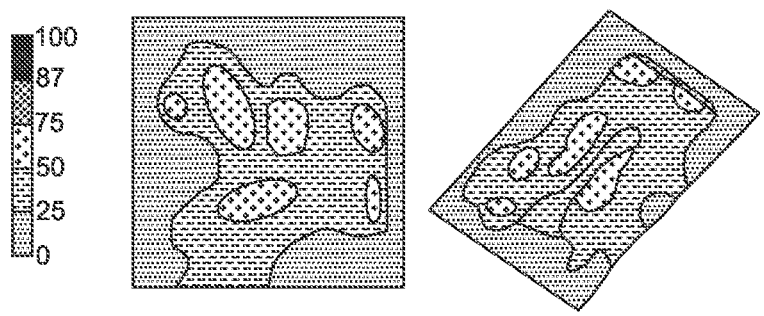
FIG. 8a is an example of a top view and a perspective view of a pressure map generated by a pressure sensor positioned over a seat back of a seat unit showing the pressure applied by a passenger seated in the seat unit to the pressure sensor in a normal seating position, according to certain embodiments of the present invention.
Figure 8B:
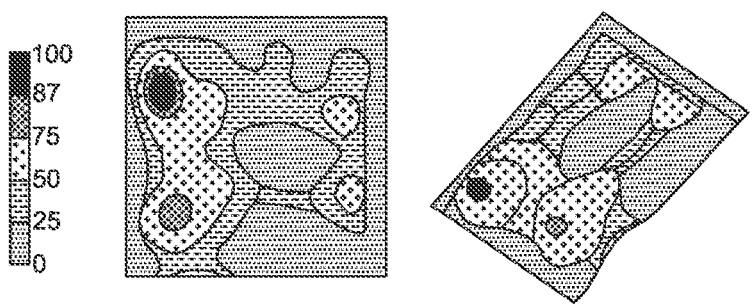
FIG. 8b is an example of a top view and a perspective view of a pressure map generated by a pressure sensor positioned over a seat back of a vehicle seat showing the pressure applied by a passenger seated in the seat unit to the pressure sensor when the passenger is pressing against the seat back, according to certain embodiments of the present invention.

In these embodiments, when a passenger wishes to recline the seat unit 1, the passenger leans back and exerts additional pressure against the seat back 3, which generates a pressure peak on the pressure map in an area corresponding to the upper portion of the seat back 3. When a pressure peak is detected by the control unit 11 in that location, the control unit 11 directs the seat unit 1 to transition into the reclined position. FIGS. 8a and 8b illustrate a pressure distribution corresponding to a normal seating position of a passenger (FIG. 8a) and a pressure distribution corresponding to a passenger exerting additional pressure against the seat back 3 to transition the seat unit 1 to the reclined position (FIG. 8b).

Conversely, when the passenger wishes to return the seat unit 1 to an upright position, the passenger leans forward, which removes pressure being exerted against the seat back 3 (mainly in the upper portion of the seat back 3), and generates a pressure drop on the pressure map in an area corresponding primarily to the upper portion of the seat back 3. When a pressure drop is detected by the control unit 11 in that location, the control unit 11 directs the seat unit 1 to transition to the upright position.

Alternatively, the automatic movement of the seat unit 1 between reclined and upright positions may be controlled through detection of a pressure transfer between an area on the pressure map corresponding primarily to the lower back area of the seat back 3 and an area on the pressure map corresponding primarily to a shoulder blade area of the seat back 3. In these embodiments, when the control unit 11 detects a pressure transfer from an area of the pressure map corresponding primarily to the lower back area of the seat back 3 to an area on the pressure map corresponding primarily to a shoulder blade area of the seat back 3, the control unit 11 directs the seat unit 1 to transition to the reclined position. Conversely, when the control unit 11 detects a pressure transfer from an area of the pressure map corresponding primarily to a shoulder blade area of the seat back 3 to an area on the pressure map corresponding primarily to the lower back area of the seat back 3, the control unit 11 directs the seat unit 1 to transition to the upright position.

In certain embodiments, the control unit 11 may monitor for a change in pressure on the seat pan 2 that indicates that the passenger has risen from the seat unit 1. When detected, the control unit 11 may direct the seat unit 1 to transition to the upright position.

To prevent unintended movement of the seat back 3, the control unit 11 may be configured to require that the change in pressure distribution (whether in the form of pressure peaks, pressure loss, or pressure transfer) be present for a time duration that exceeds a threshold time period before the control unit 11 will direct the seat unit 1 to transition into another position. In certain embodiments, the threshold time period may be approximately 30 seconds. However, this is but one example, and threshold time periods may be higher or lower depending on the needs and desired results.

Additionally and/or alternatively, a manual switch may also be provided to enable automatic adjustment of the seat unit 1.

To improve passengers' comfort, the control unit 11 may also be configured to alter the pressure distribution among the cushions 5 and/or the airbags 6 when a passenger has remained in the same position for a time duration that exceeds a threshold time period. This re-distribution of pressure after a passenger has maintained a stationary position beyond a threshold time period is designed to avoid or at least minimize potential pain associated with a local concentration of pressure applied in the same place for an extended period. In certain embodiments, the threshold time period may be approximately 1 hour. However, this is but one example, and threshold time periods may be higher or lower depending on the needs and desired results.

The control unit 11 may also be configured to alter the pressure distribution among the cushions 5 and/or the airbags 6 when the frequency of a passenger's movements exceed a maximum threshold number within a specified period of time, which may indicate that the passenger is not comfortable with the current pressure distribution. In certain embodiments, the specified period of time may be approximately 20 minutes and the maximum number of movements may be approximately 10. However, this is but one example, and specified periods of time and the maximum number of movements may be higher or lower depending on the needs and desired results.

The control unit 11 may also be configured to direct deflation of the airbags 6 when the seat unit 1 is in the bed position so that the cushions 5 are able to provide a substantially flat mattress for passengers in the bed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat unit comprising:
   a seat pan coupled to a seat back;
   a plurality of inflatable cushions positioned proximate at least one of the seat pan and the seat back;
   a plurality of inflatable airbags positioned proximate at least one of the plurality of inflatable cushions;
   a pressure sensor positioned over at least one of the seat pan and the seat back so that the plurality of inflatable cushions and the plurality of inflatable airbags are substantially covered by the pressure sensor, wherein the pressure sensor is configured to generate a pressure map; and
   a control unit communicatively coupled to the pressure sensor and configured to analyze the pressure map for at least one pressure irregularity within a pressure distribution, and configured to adjust a pressure inside at least one of the plurality of inflatable cushions or the plurality of inflatable airbags to minimize the at least one pressure irregularity within the pressure distribution, wherein the plurality of inflatable cushions of at least one of the seat pan and the seat back comprises a first underlying layer having a substantially flat support surface and the plurality of inflatable airbags form a second overlying layer supported on the support surface, wherein the second overlying layer comprises a plurality of tubular compartments connected to each other in a laterally extending array having decreasing tubular diameters from a laterally outer edge of the second overlying layer toward a center of the second overlying layer, and wherein each of the tubular compartments is not in fluid communication with another of the tubular compartments such that the tubular compartments are inflated or deflated independently of each other via separate connections.

2. The seat unit of claim 1, wherein the at least one pressure irregularity is defined as a location where the pressure is locally higher by approximately 10% compared to an average pressure.

3. The seat unit of claim 1, wherein the pressure sensor is a planar sensor made of a deformable or flexible material configured to correspond to a shape of the plurality of inflatable cushions and the plurality of inflatable airbags.

4. The seat unit of claim 1, further comprising an automatic seat adjustment, wherein the control unit is configured to control a relative movement of the seat back relative to the seat pan based on a change in the pressure distribution detected by the pressure sensor, wherein the change in the pressure distribution reflects at least one of:
    a pressure transfer between the seat pan and the seat back; and
    a pressure irregularity in a form of a pressure peak or a pressure loss over the seat pan or the seat back.

5. The seat unit of claim 4, wherein the movement of the seat back is permitted if the change in pressure distribution is present for a time duration that exceeds a threshold time period.

6. The seat unit of claim 4, further comprising a manual switch that enables the automatic seat adjustment.

7. The seat unit of claim 6, wherein the control unit is configured to deflate the plurality of inflatable airbags when the seat unit is in a bed position.

8. The seat unit of claim 1, wherein the seat pan and the seat back each comprise at least one of the plurality of inflatable cushions and at least one of the plurality of inflatable airbags, wherein the plurality of inflatable cushions are configured to provide the substantially flat support surface for the seat unit, and the plurality of inflatable airbags are configured to provide lateral support for a passenger seated in the seat unit.

9. The seat unit of claim 8, wherein the plurality of inflatable airbags comprises at least two compartments welded together, wherein each of the at least two compartments is formed by a tube that is inflated or deflated via one of the separate connections.

10. The seat unit of claim 1, wherein the plurality of inflatable cushions and the plurality of inflatable airbags are coated with a sealable material to ensure airtightness.

11. The seat unit of claim 1, wherein connections for the plurality of inflatable cushions and the plurality of inflatable airbags in a pressure distributor are located in the seat back.

12. The seat unit of claim 1, wherein the seat unit further comprises a plurality of pre-determined positions, and the seat unit is configured to
    transition into a pre-determined position selected by a passenger seated in the seat unit; and
    adapt to a shape of the passenger performing at least one of:
        changing the pressure distribution inside at least one of the plurality of inflatable cushions or the plurality of inflatable airbags; and
        changing relative orientations of at least one of the seat pan, the seat back, and a footrest around the selected pre-determined position.

13. The seat unit of claim 1, wherein the control unit is configured to alter the pressure distribution among the plurality of inflatable cushions and the plurality of inflatable airbags when a passenger seated in the seat unit has maintained a stationary position for a time duration that exceeds a threshold time period.

14. The seat unit of claim 1, wherein the control unit is configured to alter the pressure distribution among the plurality of inflatable cushions and the plurality of inflatable airbags when a frequency of movement of a passenger seated in the seat unit has exceeded a maximum threshold number within a specified period of time.

15. The seat unit of claim 1, wherein the pressure sensor covers substantially all of at least one of (i) the plurality of inflatable cushions and (ii) the plurality of inflatable airbags.

* * * * *